(12) United States Patent
Murray

(10) Patent No.: US 9,944,325 B2
(45) Date of Patent: Apr. 17, 2018

(54) VEHICLE AND CHASSIS THEREFOR

(71) Applicant: Gordon Murray Design Limited, Shalford, Surrey (GB)

(72) Inventor: Ian Gordon Murray, Puttenham (GB)

(73) Assignee: Gordon Murray Design Limited, Shalford, Surrey (GB)

( * ) Notice: Subject to any disclaimer, the term of this patent is extended or adjusted under 35 U.S.C. 154(b) by 0 days.

(21) Appl. No.: 15/104,622

(22) PCT Filed: Dec. 16, 2014

(86) PCT No.: PCT/EP2014/077895
§ 371 (c)(1),
(2) Date: Jun. 15, 2016

(87) PCT Pub. No.: WO2015/091437
PCT Pub. Date: Jun. 25, 2015

(65) Prior Publication Data
US 2016/0318553 A1 Nov. 3, 2016

(30) Foreign Application Priority Data

Dec. 17, 2013 (GB) .................................. 1322297.1

(51) Int. Cl.
*B60J 7/00* (2006.01)
*B62D 21/15* (2006.01)
(Continued)

(52) U.S. Cl.
CPC ............ *B62D 21/157* (2013.01); *B60R 19/42* (2013.01); *B62D 23/005* (2013.01)

(58) Field of Classification Search
CPC ..... B60R 19/34; B60R 21/205; B60R 21/217; B62D 21/15; B62D 21/152; B60G 11/28; B60G 2204/126; F16F 7/12
See application file for complete search history.

(56) References Cited

U.S. PATENT DOCUMENTS 4,045,075 A * 8/1977 Pulver .................... B62D 21/08
                                                              280/798
4,355,844 A * 10/1982 Fantini
                                    Muzzarelli ........... B62D 23/005
                                                              280/784
(Continued)

FOREIGN PATENT DOCUMENTS

DE       102008019167      11/2009
WO       WO 2010007269      1/2010

OTHER PUBLICATIONS

International Searching Authority—European Patent Office, International Search Report and Written Opinion, PCT/EP2014/077895, dated Feb. 17, 2015; 10 pages.

*Primary Examiner* — Kiran B Patel
(74) *Attorney, Agent, or Firm* — Sunstein Kann Murphy & Timbers LLP

(57) ABSTRACT

We improve still further the crashworthiness of a tubular-frame chassis by providing a means for absorbing lower-energy impacts without deforming the tubular steel frame, The vehicle comprises a chassis structure including a load-bearing tubular chassis member extending longitudinally within the vehicle, at least one crush structure located laterally outside of the chassis member, the crush structure having an upper and a lower extent that overlap with an upper and lower extent of the chassis member. In this way, the crush structure is able to interact with the chassis member, transferring impact forces to the chassis member and thereby reducing the necessary size (and weight) of the crush structure. The crush structure is preferably removable, to allow replacement after an impact. Alternatively, the crush structure part of a door of the vehicle, positioned as necessary when the door is closed.

8 Claims, 6 Drawing Sheets

(51) Int. Cl.
*B60R 19/42* (2006.01)
*B62D 23/00* (2006.01)

(56) References Cited

U.S. PATENT DOCUMENTS

| | | | | |
|---|---|---|---|---|
| 4,493,506 A * | 1/1985 | Alexander | B60R 13/04 | 293/128 |
| 4,662,467 A * | 5/1987 | Arai | B60G 3/24 | 180/210 |
| 4,988,120 A * | 1/1991 | Jones | B60G 5/00 | 180/271 |
| 5,094,313 A * | 3/1992 | Mauws | B62D 21/08 | 180/210 |
| 5,464,266 A | 11/1995 | Guertler | | |
| 5,573,297 A * | 11/1996 | DeRees | B60J 5/0412 | 296/146.6 |
| 5,713,589 A * | 2/1998 | Delgado | B60R 3/00 | 182/190 |
| 5,785,376 A * | 7/1998 | Nees | B60J 5/0444 | 296/146.6 |
| 5,806,917 A * | 9/1998 | Townsend | B60J 5/0426 | 296/146.1 |
| 5,848,853 A * | 12/1998 | Clenet | B62D 23/005 | 280/781 |
| 5,884,960 A * | 3/1999 | Wycech | B29C 44/1228 | 296/146.6 |
| 5,887,938 A * | 3/1999 | Topker | B60J 5/0444 | 296/146.6 |
| 5,908,216 A * | 6/1999 | Townsend | B60J 5/045 | 296/146.5 |
| 5,954,364 A * | 9/1999 | Nechushtan | B60R 21/13 | 280/781 |
| 6,196,619 B1 * | 3/2001 | Townsend | B60J 5/0444 | 296/146.6 |
| 6,312,028 B1 * | 11/2001 | Wilkosz | B60R 19/18 | 188/377 |
| 6,357,822 B1 | 3/2002 | Panoz | | |
| 6,371,767 B1 * | 4/2002 | Libby | G09B 19/0069 | 296/205 |
| 6,722,037 B2 * | 4/2004 | Nees | B60J 5/0444 | 29/897.2 |
| 7,077,233 B2 * | 7/2006 | Hasegawa | B62D 5/087 | 180/426 |
| 7,441,826 B2 * | 10/2008 | Frank | B60J 5/0447 | 296/146.6 |
| 7,658,258 B2 * | 2/2010 | Denney | B62D 21/08 | 180/311 |
| 8,091,286 B2 * | 1/2012 | Totani | B60J 5/0401 | 296/146.5 |
| 8,152,218 B2 * | 4/2012 | Hall | B60J 5/0451 | 296/146.6 |
| 8,163,116 B2 * | 4/2012 | Riley | B62D 23/005 | 156/294 |
| 8,444,191 B2 * | 5/2013 | Akers | B60R 13/04 | 293/128 |
| 8,464,827 B2 * | 6/2013 | Tsumiyama | B62D 21/183 | 180/311 |
| 8,684,410 B2 * | 4/2014 | Kwon | B62D 33/0617 | 280/756 |
| 8,727,421 B2 * | 5/2014 | Cohoon | B60J 5/0425 | 296/146.6 |
| 8,833,502 B2 * | 9/2014 | Sellars | F01N 13/00 | 180/296 |
| 9,266,412 B2 * | 2/2016 | Fujihara | B60J 5/0443 | |
| 9,365,241 B1 * | 6/2016 | Taracko | B62D 21/155 | |
| 2004/0066025 A1 * | 4/2004 | Borroni-Bird | B62D 21/152 | 280/781 |
| 2005/0184501 A1 * | 8/2005 | Tijerina | B62D 21/02 | 280/781 |
| 2011/0024221 A1 * | 2/2011 | Murray | B62D 23/005 | 180/312 |
| 2012/0098300 A1 * | 4/2012 | Murray | B62D 23/005 | 296/205 |
| 2013/0270864 A1 | 10/2013 | Young | | |
| 2016/0046336 A1 * | 2/2016 | Norman | B62D 63/025 | 180/312 |
| 2017/0129541 A1 * | 5/2017 | Murray | B62D 21/183 | |
| 2017/0197658 A1 * | 7/2017 | Dowle | B62D 21/02 | |

\* cited by examiner ic # VEHICLE AND CHASSIS THEREFOR

FIELD OF THE INVENTION

The present invention relates to a vehicle, and to its chassis.

BACKGROUND ART

Our earlier patent applications WO2009/122178, WO 2010/149981 and WO2012/010850 described chassis structures suitable for a compact and lightweight city car. These employ a tubular steel frame to which planar composite sheets are bonded, the combination resulting in a high level of rigidity and crashworthiness.

SUMMARY OF THE INVENTION

The present invention seeks to build on and improve further the crashworthiness of the chassis shown in WO2009/122178 et al by providing a means for absorbing lower-energy impacts without deforming the tubular steel frame. Such damage requires significant remedial work in order to return the vehicle to its pre-impact state and repair may therefore be uneconomical. One option is of course to add an outer impact-absorbing structure such as is disclosed in US2013/0088045A1 in which a sill structure is bolted to the chassis members in order to absorb smaller collisions. However, this is an inefficient solution which imposes a significant weight penalty, as a sill that is able to absorb anything other than a trivial collision will be a substantial item, as illustrated in US2013/0088045A1.

The present invention therefore provides a vehicle, comprising a chassis structure including a load-bearing tubular chassis member extending longitudinally within the vehicle, at least one crush structure located laterally outside of the chassis member, the crush structure having an upper and a lower extent that overlap with an upper and lower extent of the chassis member. In this way, the crush structure is able to interact with the chassis member, transferring impact forces to the chassis member and thereby reducing the necessary size (and weight) of the crush structure.

The crush structure is preferably held in position relative to the chassis member in a removable manner. This means that after an impact in which there is no damage to the chassis member, the crush structure can be removed and replaced easily. Ideally, the crush structure is held in position relative to the chassis member by at least one detachable fixing, such as a bolt, a rivet, an adhesive, or a spot weld. Alternatively, the crush structure can be held in position relative to the chassis member by a hinged attachment to the chassis structure, such as by providing the crush structure as part of a door of the vehicle. The door, when closed, can locate the crush structure in the correct placement relative to the chassis member. After an impact, the door can be replaced. In such an arrangement, the crush structure can be located in a lower sill of the door.

The crush structure can comprise a hollow section enclosing an energy-absorbing element, such as a foam. The crush structure can contain one or more internal dividing walls, and the energy-absorbing element (where present) can be located on one side of the internal dividing wall. In that case, the wall can contain an aperture through which the energy-absorbing element can be forced, thereby to assist in absorbing an impact.

The chassis structure may further comprise cross-members extending between the longitudinal chassis members, and planar sheets bonded to the chassis structure. The planar sheets can be of a composite material. The chassis members and/or the cross-members may be of a circular section tube, or a square section tube, or another cross-section.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
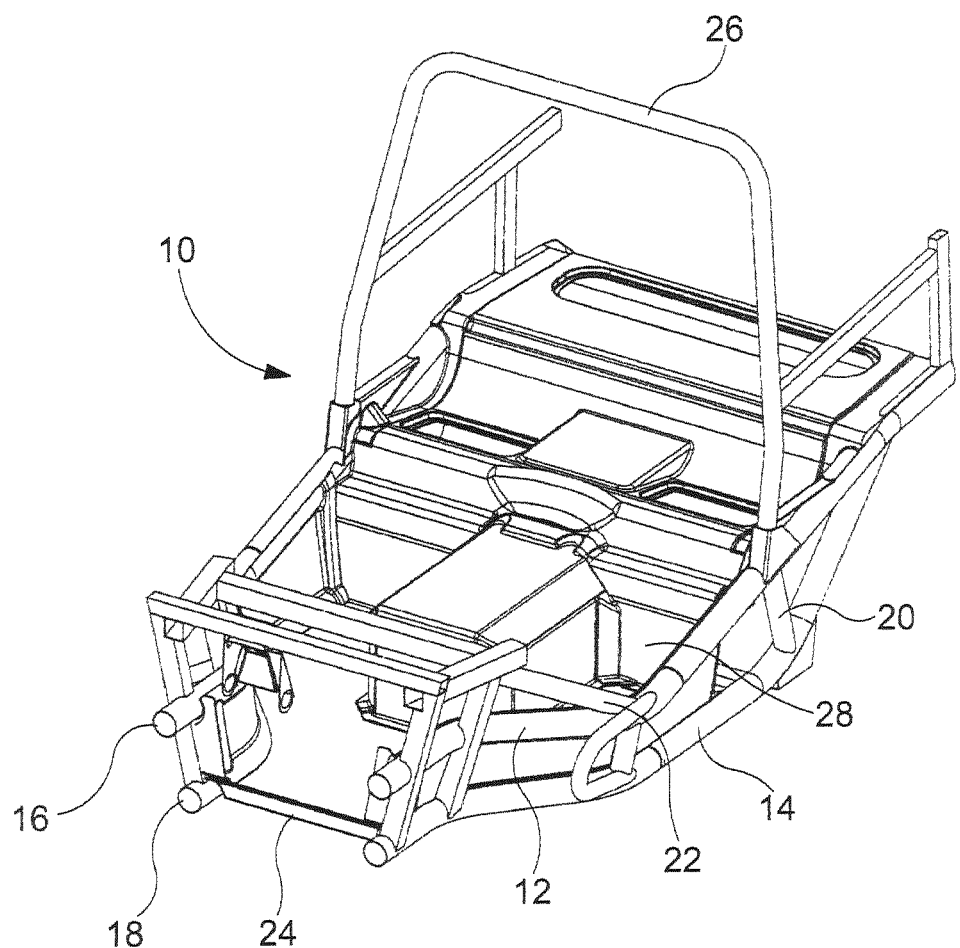
FIG. 1 shows a chassis structure according to WO2009/122178.

Referring to FIG. 1, this shows a chassis structure as disclosed in WO2009/122178 et seq. The present invention is applicable to this style of chassis, and also to other forms of chassis that include at least one longitudinal section of a circular, square, rectangular or other cross-section. The chassis 10 of FIG. 1, by way of example, employs two pairs of longitudinal circular-section tubes which run from the front of the vehicle towards the rear, and are arranged as a left upper tube 12, a left lower tube 14, a right upper tube 16 and a right lower tube 18. The tubes on each side of the vehicle are arranged generally above and below each other, with generally upright sectional elements 20 connecting them. In addition, several cross-members such as that indicated at 22 run between corresponding tubes on either side in order to complete the framework. In this example, the upright sectional elements are circular-section and the cross-members are square section, but either of these could be adapted to use other cross-sections as required.

A front basket 24 is provided, attached to frontal sections of the longitudinal sections 12, 14, 16, 18 in order to provide a mounting location for steering, and braking systems. A hoop 26 is provided in order to allow for roll-over protection.

The framework structure of this example is provided with composite panels 28 that are bonded to the framework. These provide bracing to the framework, distributing loads across the chassis. The result is a light and rigid chassis that requires very much less material than a conventional pressed-steel chassis. The present invention is particularly beneficial when applied to a chassis of this type, but can also be applied to other chassis structures.

Figure 2:
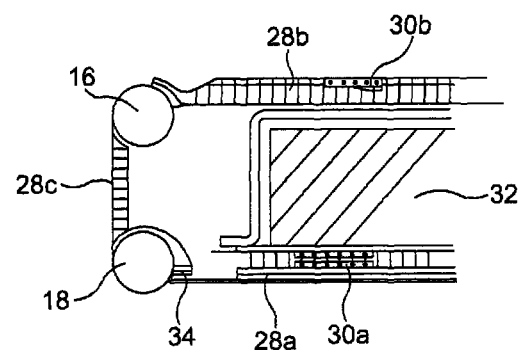
FIG. 2 shows a section through a chassis structure according to WO2009/122178 and WO2012/010850.

FIG. 2 shows a vertical section through a variant of the above-described chassis, as described in our earlier applications WO2009/122178 and WO2012/010850. The right-hand longitudinal tubes 16, 18 can be seen, together with their circular section. Composite panels are attached to the tubes, including a lower panel 28a that extends horizontally from the lower right tube 18, and upper panel 28b that extends horizontally from the upper right tube 16, and a side panel 28*c* that extends vertically between the upper right tube 16 and the lower right tube 18. The lower and upper panels include a directional fibre reinforcement 30*a*, 30*b* (respectively) to assist in load distribution via the panels. The lower panel 28*a* carries a battery 32 for powering an electric motor in the vehicle, and is attached to the lower tube 18 via a detachable fixing 34 so that the battery 32 can be removed easily for recharging or replacement.

Figure 3:
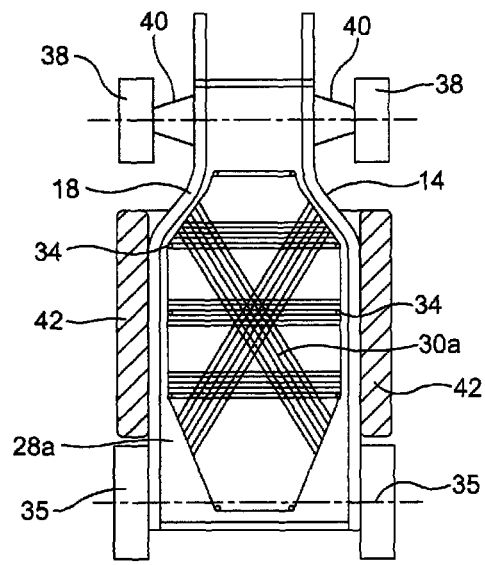
FIG. 3 shows the structural concept of the invention.

FIG. 3 shows a view of the underside of a vehicle according to the present invention. The lower longitudinal tubes 14, 18 can be seen, together with the lower panel 28*a*, its reinforcement 30*a* (shown schematically) and the fixings 34. Rear wheels 35 are attached to the chassis via independent rear suspension (see WO2010/100412) and are driven by a rear-mounted engine 36. Front wheels 38 are each attached to the chassis via a front suspension 40.

In order to protect the longitudinal tubes 12, 14, 16, 18 (especially) against a side impact, the present invention proposes the provision of crush structures 42 covering at least part of the region between the front wheels 38 and the rear wheels 34, located laterally outside the longitudinal tubes 12, 14, 16, 18. Whilst the chassis is sufficiently strong to withstand such impacts and comply with the applicable crash standards, this can involve damage to the longitudinal tubes which will be a major task to repair. Thus, if this could be avoided, at least for some levels of impact, the vehicle would be more easily repairable. However, the crush structures 42 must not negate the design aims of the chassis as a whole, i.e. that of light weight with rigidity, and must therefore not be so massive as to impose an excessive weight penalty on the vehicle. This results in a crush structure that is able to absorb only very minor impacts, with a significant impact still resulting in deformation of the longitudinal tubes.

Figure 4:
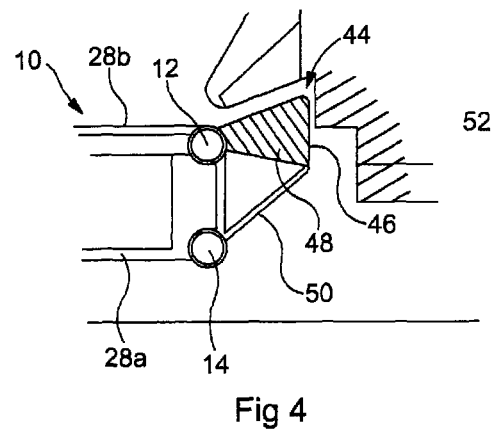
FIG. 4 shows a first embodiment of the invention.

According to the present invention, the crush structure is designed to work in conjunction with the remainder of the chassis, so that some of the impact is absorbed by the crush structure and some is dissipated into the chassis. This will expand the range of impacts in which the chassis tubes are not deformed and make the small additional weight of the crush structures worthwhile. FIG. 4 shows the concept by which this is achieved. The chassis 10 carries a side crush structure 44 which is mounted to the upper longitudinal bar 12 and comprises a trapezoidal-section hollow body 46 filled with a crushable foam material 48 such as a closed rigid cell structural foam. The section 46 is mounted level with the longitudinal bar 12 and is supplemented with a bracing panel 50 that extends from an outer edge of the trapezoidal section 46 to a connection point with the lower longitudinal bar 14. Thus, in a side impact with a solid object 52, the crush structure 46, 48 deforms to absorb some impact energy, but the fact that at least some of the structure is level with the longitudinal bar 12 means that some of the force of the impact is transmitted through the crush structure to the bar 12 and thence into the chassis 10 as a whole. The bracing 50 serves to hold the crush structure 46, 48 in the generally correct location during the impact, and also provides some aesthetic benefit at other times. The dimensions of the crush structure 46, 48 and its wall thicknesses (etc) are tailored to provide deformation properties so that it deforms slightly before the longitudinal bars 12, 14, thereby limiting the forces that are transmitted to the chassis 10 as necessary.

Of course, there will be a degree of side impact which is high enough to result in deformation of the chassis bars 12, 14, 16, 18. Such an impact would progressively deform the crush structure 44 until it had reached a limiting deformation at which higher forces would be transmitted to the chassis 10. Those higher forces will in some circumstances be sufficient to deform the chassis bars. However, the effect of the crush structure is to raise the threshold point at which chassis deformation takes place by an amount generally corresponding with the energy required to completely crush the crush structure 44. Further, by designing the crush structure 44 so that at least part of it is level with a chassis bar 12, the two can interact during an impact so that the crush structure is not called upon to absorb all or substantially all the impact energy. This allows the crush structure to be sufficiently small and light to be incorporated into a practical lightweight chassis for a small city car.

Figure 5:
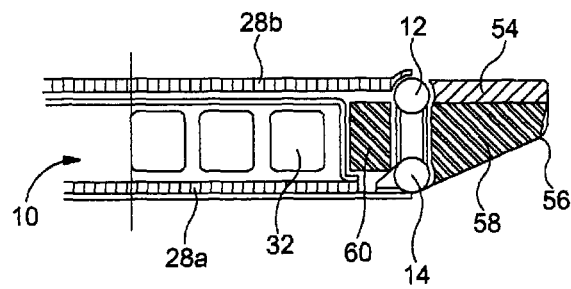
FIG. 5 shows a second embodiment of the invention.

There are a number of possible designs for the crush structure. FIGS. 5 to 11 show further examples, in which like reference numerals are used to denote like parts. Thus, FIG. 5 shows a design in which a rectangular composite moulding 54 is located level with the upper bar 12. A trapezoidal support 56 is located beneath the moulding 54 and is filled with an energy-absorbing foam 58. Mechanical fastenings such as bolts, rivets, adhesive and/or spot welds are used to attach the structure to the upper and lower bars 12, 14; these can be easily reversed after an impact in order to remove the original crush structure and replace it. A further foam filling 60 is used inside the chassis to fill space around the batteries 32 to prevent them from moving during an impact; as in our previous applications the batteries are enclosed within a sandwich structure bounded laterally by the chassis bars 12, 14, 16, 18 and vertically by the upper composite panel 28*b* which is bonded to the chassis bars, and the lower chassis panel 28*a* which is fixed mechanically to the remainder of the chassis in order to allow removal of the batteries for replacement or renewal.

Figure 6:
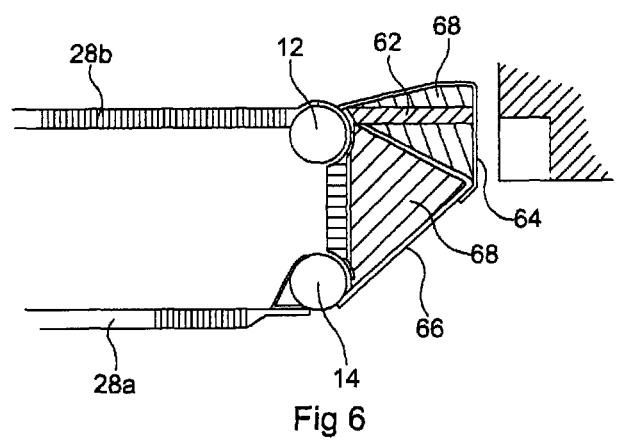
FIG. 6 shows a third embodiment of the invention.

FIG. 6 shows an arrangement with a central composite crush member 62 which is held level with the upper chassis bar 12 (as in FIG. 5) but supplemented by two triangular-section structures 64, 66. The lower triangular structure 66 is attached mechanically to the upper and lower chassis bars 12, 14 via mechanical fixings (as before). The upper triangular structure 64 extends from the upper chassis bar 12 to enclose the crush member 62, and connects to the outermost corner of the lower triangular structure 66 to form a smooth outer surface. The interior spaces of the two triangular structures 64, 66 are filled with an energy-absorbent foam 68, which also assists in supporting the crush structure 62.

Figure 7:
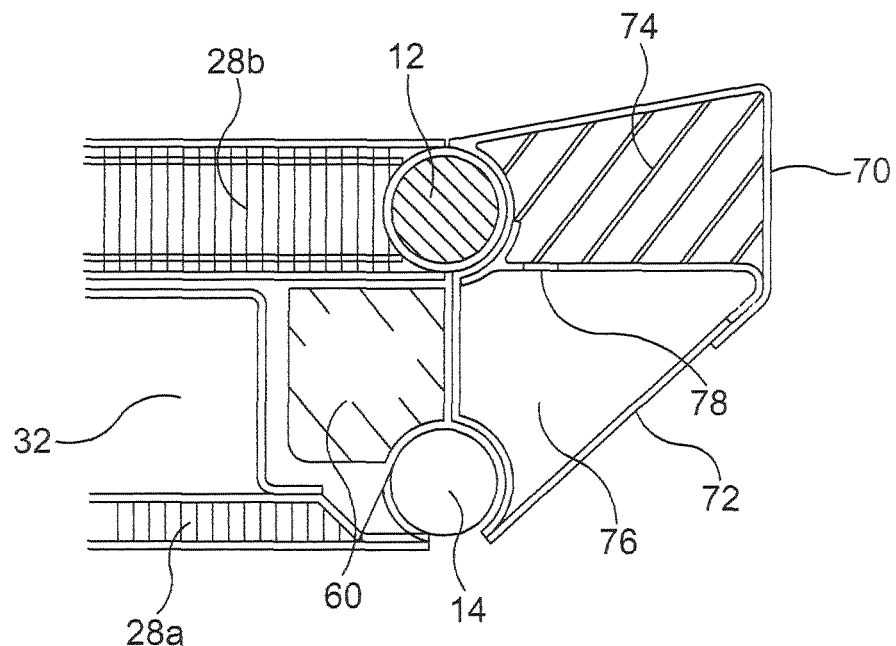
FIG. 7 shows a fourth embodiment of the invention.

FIG. 7 shows an embodiment comprising two composite mouldings 70, 72. An upper moulding 70 is located level with the upper chassis bar 12 and contains a high-density energy absorbent foam 74 within its otherwise hollow interior. A lower moulding 72 is located immediately beneath the upper moulding, sharing a dividing wall between the interior spaces of the two mouldings. Relative to the chassis, the lower moulding sits to one side of and vertically between the chassis bars 12, 14. The lower moulding is fixed mechanically to the lower chassis bar 14 and the upper moulding is fixed mechanically to the upper chassis bar 12.

The otherwise-hollow interior of the lower moulding is filled with a low-density energy absorbent foam 76. In this context, "low density foam" denotes a foam having a lower density than the "high density foam", and vice versa. An exhaust aperture 78 is formed in the shared dividing wall between the two mouldings, so that under impact the high density foam, compressed between the impacting object and the upper chassis bar 12, will be forced out of the upper moulding 70 and into the lower moulding 72. That movement will be resisted but not prevented by the lower density foam. In this way, the crush resistance exhibited by the upper moulding 70 can be tailored very closely by variation of the size and shape of the aperture, and by the number and spacing of the apertures if more than one is provided. Ideally, several such apertures will be provided along the length of the section, but is may also be advantageous to provide more than one aperture or row of apertures, spaced laterally. Further tailoring of the crush resistance can be obtained by selection of the actual densities of the two foams. Thus, increasing the density of the high-density foam will increase the crush resistance for a fixed aperture size, but this can be counteracted by reducing the density of the low-density foam as it will then present less resistance to exhaust of the high-density foam via the aperture.

Figure 8:
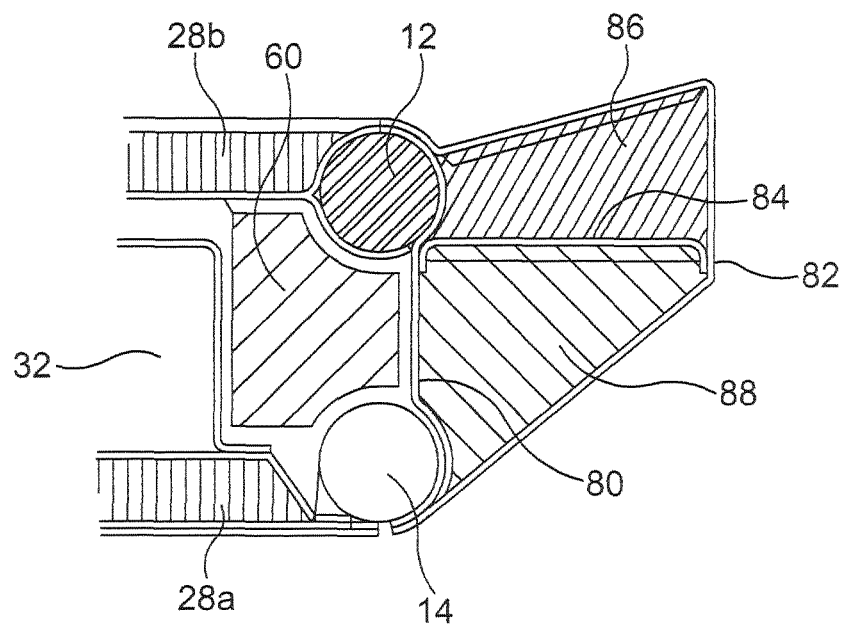
FIG. 8 shows a fifth embodiment of the invention.

FIG. 8 shows an alternative arrangement of sections which collectively form the crush structure. This embodiment is made up of three formed profiles bonded together to make the necessary sectional shape. An inner face 80 sits against the upper and lower chassis tubes 12, 14 and is, at either end, partly conformal to the chassis tubes. An outer face 82 joins to the inner face at its upper and lower extremities and extends laterally outward between those two points to define (with the inner face 80) a generally trapezoidal shape. An internal rib 84 extends within the trapezoid from the inner face 80 to the outer face 82 and divided the interior of the trapezoid, thus strengthening the structure. The two interior regions thus defined are both filled with impact-absorbing foams 86, 88. The sections can be of a composite material, a plastics material, or a metallic material. The complete structure is then mechanically attached to the chassis tubes 12, 14.

Figure 9:
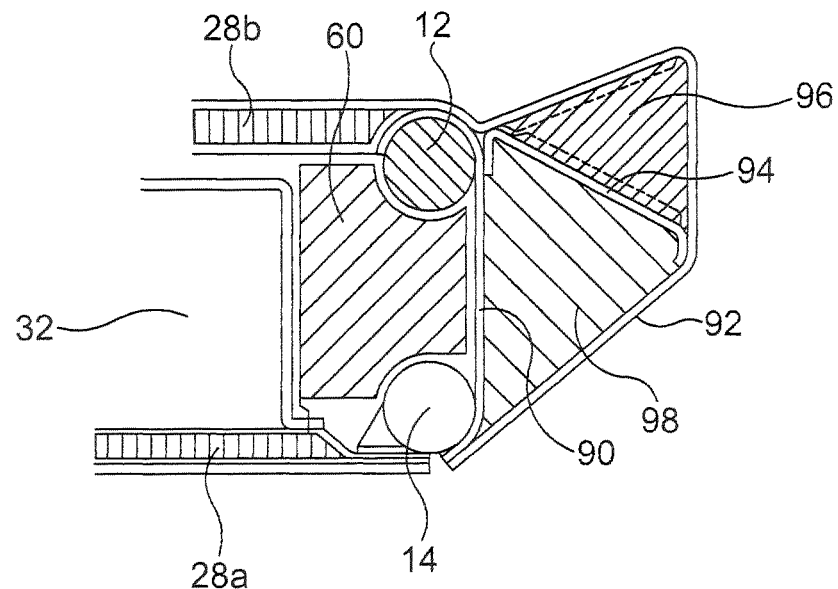
FIG. 9 shows a sixth embodiment of the invention.

FIG. 9 shows a similar arrangement to FIG. 8, with an inner face 90, an outer face 92, an internal rib 94, and foam fillings 96, 98. In this arrangement, the spatial arrangement is difference such that the outer face 92 is trapezoidal in profile, and the internal rib 94 extends from the meeting point of the inner and outer faces 90, 92 across the interior space of the structure to the opposing corner of the outer face 92. Thus, the structure is divided into two triangular-section shapes, adding to the rigidity of the crush structure and assisting in tailoring its crush properties to those required.

Figure 10:
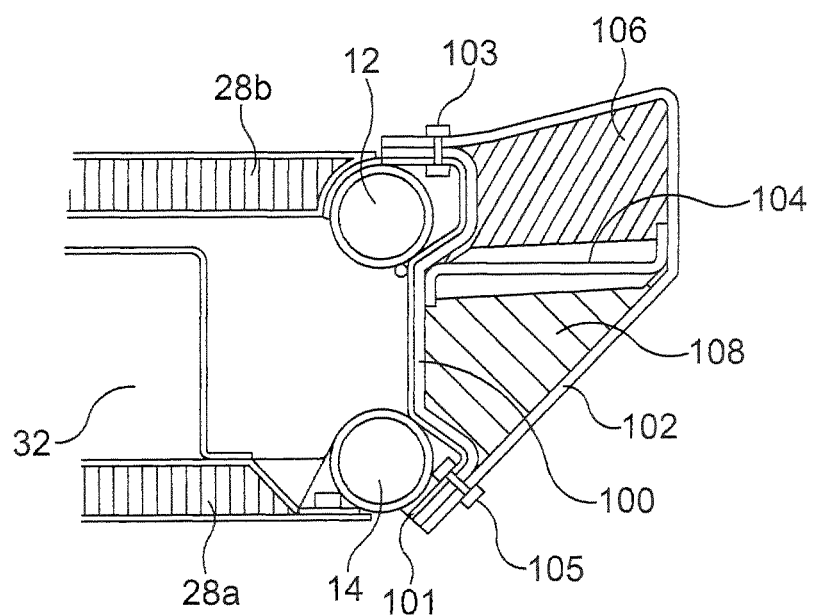
FIG. 10 shows a seventh embodiment of the invention.

FIG. 10 shows a further arrangement, also employing an inner face 100, an outer face 102, an internal rib 104, and foam fillings 106, 108 in the same general arrangement. The inner face 100 is however provided with two prominent channels corresponding to the chassis tubes 12, 14, which fit snugly over a correspondingly-profiled section 101 attached securely to the chassis tubes 12, 14. A spacing is maintained between the section 101 and the chassis tubes, to accommodate threaded fixings on the inner face of the section 101; corresponding holes on the inner face 100 and the overlapping outer face 102 allow bolts 103, 105 to be inserted through the holes and engage with the threaded fixings to hold the crush structure in place. This can be repeated at intervals along the length of the crush structure.

Figure 11:
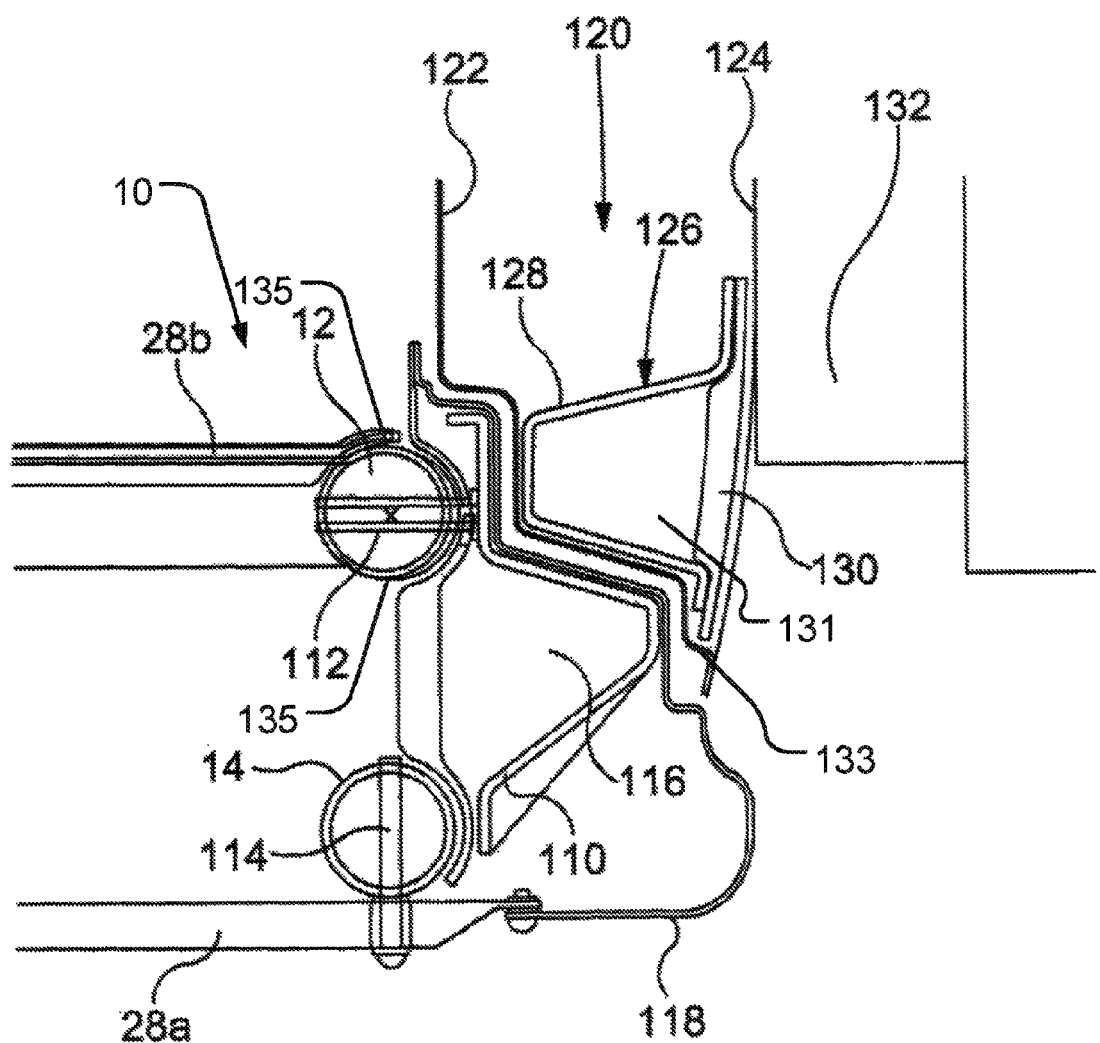
FIG. 11 shows an eighth embodiment of the invention.

FIG. 11 shows a portion of different embodiment. The tubular chassis 10 includes chassis rails 12, 14 that are again braced by chassis panels 28a, 28b and other structures as explained in relation to FIGS. 1 and 2. An outer profile 110 support brace portion of the crush structure 126 is secured to the upper chassis rail 12 via bolts 112 which are repeated at intervals, and to the lower chassis rail 14 by adhesive bonding; the outer profile 110 lies adjacent the two chassis rails but diverges laterally outward between them to define a rigid sill to the vehicle. An impact-absorbent foam 116 is provided behind the divergent portion of the profile 110. An outer skin 118 is provided for cosmetic purposes, substantially conformal to the upper face of the sill shape so that a foot placed on the sill is supported, but shaped aesthetically elsewhere. The lower chassis panel 28a is bolted to the lower chassis bar 14 at intervals via bolts 114 and also extends slightly beyond the chassis rail 14 to provide an anchor point for the outer skin 118.

This crush structure then presents a rigid outer surface at the level of the upper chassis rail 12. This is filled by a door structure 120 comprising an inner skin 122 that forms a lower door sill and an outer skin 124 whose profiles are chosen so as to provide the desired aesthetic effect and to define an internal space for various structures such as a lock mechanism, window winders and the like. At the lower extremity of this internal space, there is a main crush structure 126 that is held by the closed door structure just above the sill and substantially level with the upper chassis bar 12, with the crush structure 126 having an upper extent 128 and a lower extent 133 that overlap with an upper extent 134 and lower extent 135 of the upper chassis member 12. The crush structure also is defined by inner and outer faces 128, 130; the outer face 130 is largely flat albeit with a slight curve to match the shape of the outer door skin 124 whereas the inner face 128 is trapezoidal with flanged edges to allow attachment to the outer face 130. The internal space thus defined is filled with an impact-absorbing foam. As above, the various sections can be of a composite material, a plastics material, or a metallic material as desired.

Block 132 represents standard typical Euro-NCAP or federal side impact test piece and thus, in a standard impact of these types will strike the door over the crush structure 126. Initially, the door skin will be deformed, followed immediately by the crush structure 126 which will be compressed between the standard impactor type block 132 and the upper chassis rail 12. Impact forces will thus be transmitted to the chassis as described above, without deforming the chassis. After an impact, the damaged door 120 can be replaced with a new door, thus replacing the crush structure 126 as well.

The various embodiments all illustrate variations on the basic theme of the invention, and the variants in each specific embodiment can, if desired, be applied to the other embodiments.

It will of course be understood that many variations may be made to the above-described embodiment without departing from the scope of the present invention.

The invention claimed is:

1. A vehicle, comprising
   a chassis structure including an upper load-bearing tubular chassis member and a separate lower load-bearing tubular chassis member, both of which extend longitudinally within the vehicle;
   at least one crush structure mounted to the upper chassis member and located laterally outside of the chassis members;
   the crush structure having an upper extent and a lower extent that overlap with an upper and lower extent of the upper chassis member.

2. A vehicle according to claim 1 in which the crush structure is held in position relative to the chassis member in a removable manner.

3. A vehicle according to claim 2, in which the crush structure is part of a door of the vehicle.

4. A vehicle according to claim 3 in which the crush structure is located in a lower sill of the door.

5. A vehicle according to claim 1, in which the crush structure comprises a hollow section enclosing an energy-absorbing element.

6. A vehicle according to claim 5 in which the energy-absorbing element comprises a foam.

7. A vehicle according to claim 1, further comprising planar sheets bonded to the chassis structure.

8. A vehicle according to claim 7, in which the planar sheets are of a composite material.

* * * * *